United States Patent [19]

Nossen et al.

[11] 4,130,802
[45] Dec. 19, 1978

[54] UNIDIRECTIONAL PHASE SHIFT KEYED COMMUNICATION SYSTEM

[75] Inventors: Edward J. Nossen, Cherry Hill; Vytas F. Volertas, Delran, both of N.J.

[73] Assignee: RCA Corporation, New York, N.Y.

[21] Appl. No.: 649,547

[22] Filed: Jan. 15, 1976

[51] Int. Cl.² .......................................... H04L 27/10
[52] U.S. Cl. ................................. 325/30; 178/67
[58] Field of Search .................. 178/67; 325/30–49, 325/50–60, 137; 332/9 R–16, 23 R–44

[56] References Cited

U.S. PATENT DOCUMENTS

| 3,343,093 | 9/1967 | Gerwen | 325/60 |
| 3,423,529 | 1/1969 | O'Neill | 325/30 X |
| 3,597,688 | 8/1971 | Ogi | 325/30 |

Primary Examiner—Benedict V. Safourek
Attorney, Agent, or Firm—H. Christoffersen; Samuel Cohen; Carl M. Wright

[57] ABSTRACT

A unidirectional phase shift keyed (UPSK) communication system wherein the data sequence to either an in-phase channel or a quadrature channel is delayed by a one-half bit period with respect to the data sequence to the other channel whereby bi-phase modulation is effected in phase shift steps in a predetermined phasor direction.

9 Claims, 7 Drawing Figures

UNIDIRECTIONAL PHASE SHIFT KEYED COMMUNICATION SYSTEM

CROSS-REFERENCE TO RELATED DISCLOSURES

Of interest is co-pending application Ser. No. 649,325 (RCA 67,538) by D. E. Aubert entitled "Phase Lock Loop Controlled Bi-phase Modulator" filed on or about even date herewith.

BACKGROUND OF THE INVENTION

1. Field of the Invention

The present invention relates to phase shift keying communication systems.

2. Description of the Prior Art

In order to avoid inter-channel interference in high density, multichannel radio communication systems, strict control of the transmission output frequency spectrum in such communication systems is desirable. In addition, efficiency requirements in many communication systems, particularly satellite communication systems, dictate the use of non-linear amplifiers, such as Class B or Class C amplifiers. Thus, compatibility with non-linear amplifiers has become an important design criterion for transmitters in such communication systems.

To control such transmission frequency spectra, and eliminate spectrum splatter, conventional communication systems have utilized techniques known in the art as offset-keyed quaternary phase shift keying (OK-QPSK) and minimum shift keying (MSK). The implementation of such techniques, however, is relatively complex, particularly with respect to demodulation of the signal. Another technique to reduce the output frequency spectrum, a technique termed "unidirectional phase shifting" wherein the phase of a carrier signal is continuously advanced in one direction by a discrete step every time a data level transition occurs, is described in U.S. Pat. No. 3,659,202 issued Apr. 25, 1972 to H. Kaneko. In the system described in the Kaneko patent, however, each shift of carrier signal phase by the predetermined discrete step, for example $\pi/4$ radians, is indicative of a data transition, thus requiring the demodulator to be capable of demodulating phase increments equal to the discrete step ($\pi/4$). Such a demodulator is relatively complex and expensive. A communication system, having an output frequency spectrum comparable to that of OK-QPSK and MSK systems, that may be implemented in a relatively simple and inexpensive manner is thus desirable.

SUMMARY OF THE INVENTION

The present invention is directed to an output-frequency spectrum controlled communication system which can be implemented simply. Within the transmitter, in-phase and quadrature carrier signals are generated, each being phase modulated in accordance with the data to be transmitted. The modulated in-phase and quadrature signals are summed to produce an output signal. The frequency spectrum of the output signal is controlled by delaying one of the in-phase and quadrature carrier signals with respect to the other by substantially one-half of a bit period.

DETAILED DESCRIPTION OF PREFERRED EMBODIMENTS

Figure 1:
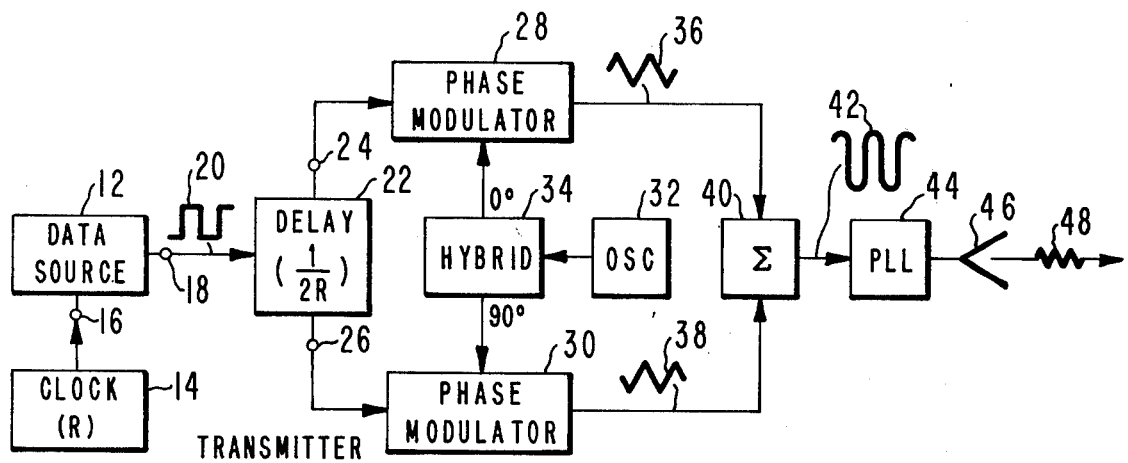
FIG. 1 is a block diagram of a UPSK transmitter in accordance with the present invention.

Referring to FIG. 1 there is shown a data source 12 which generates, at an output terminal 18, a bilevel code signal 20. Data source 12 is driven by a signal applied to a clock input terminal 16 from a clock 14. Such clock signal is indicative of a predetermined bit rate R. Code signal 20 is applied to a delay 22 having output terminals 24 and 26. Delay 22 may be switchable with respect to the relative lag or lead of the respective output signals at terminals 24 and 26. A preferred embodiment of a switchable delay 22 will be described below in conjunction with FIG. 6. Delay output terminals 24 and 26 are respectively coupled to bi-phase modulators 28 and 30. For a description of suitable bi-phase modulators 28 and 30, reference is made to the balanced modulators described in M. Schwartz, "Information Transmission, Modulation and Noise" McGraw-Hill Book Co., 2nd Ed., Section 4—4. Phase modulators 28 and 30 are also respectively receptive of first and second carrier signals. Both carriers are of the same frequency, $f_o$, but the second carrier is phase shifted with respect to the first carrier by $\pi/2$ radians. Such first and second carrier signals are respectively termed the "in-phase" and "quadrature" carrier signals, and are generated, for example, by conventional oscillator 32 and hybrid 34. The respective output signals 36 and 38 of phase modulators 28 and 30 are applied to a conventional summer 40. The output signal 42 of summer 40 is applied through a phase lock loop such as described in the aforementioned copending application of D. E. Aubert, Ser. No. 649,325 (RCA 67,538) entitled "Phase Lock Loop Controlled Bi-Phase Modulator", generally indicated as 44, to a transmitting antenna 46, which radiates the PLL output signal as a transmitted signal 48, hereinafter termed Unidirectional Phase Shift Keyed (UPSK) signal 48. PLL 44 may, in the alternative, be replaced by a conventional series of bandpass filters, limiters and amplifiers.

Figure 2:
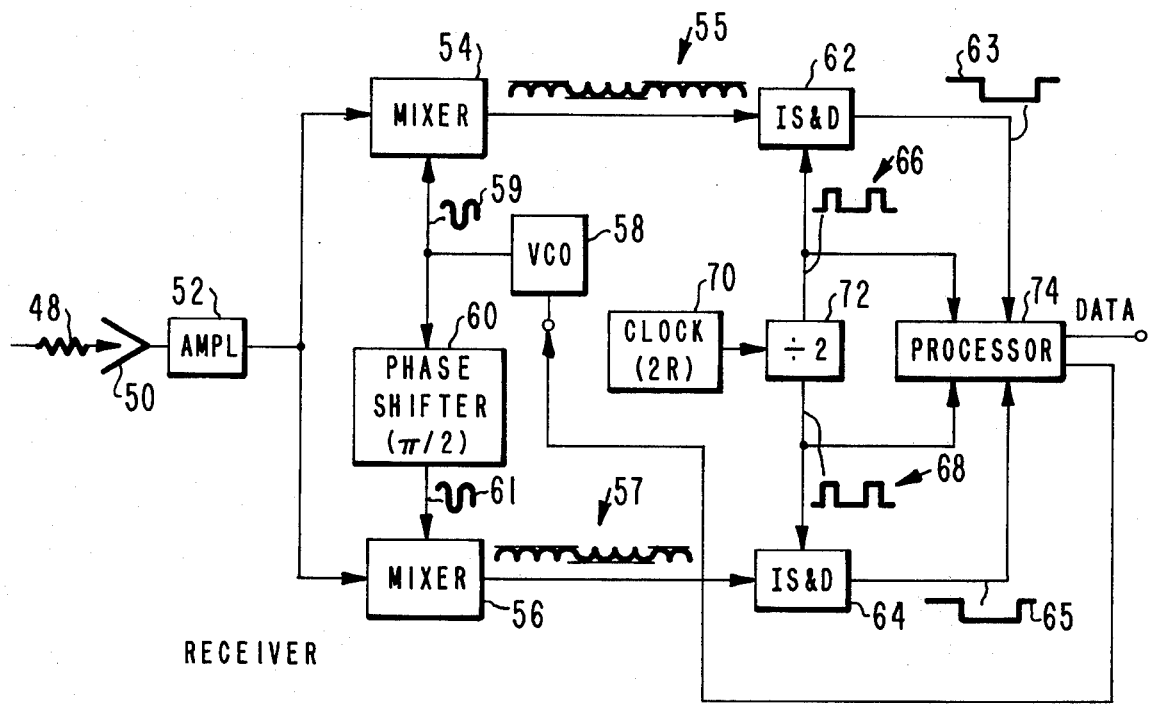
FIG. 2 is a block diagram of a receiver in accordance with the present invention.

Referring now to FIG. 2, UPSK signal 48 generated by the transmitter of FIG. 1 is received by an antenna 50 of a suitable receiver. The received signals are passed through a suitable amplifier 52 to first and second conventional mixers 54 and 56, hereinafter respectively termed "I-mixer" 54 and "Q-mixer" 56. I-mixer 54 is receptive of, in addition to the received signals, a local oscillator signal 59, having a frequency representative of the carrier frequency ($f_o$) of UPSK signal 48. Local oscillator signal 59 is generated by a conventional VCO 58 and is applied to I-mixer 54 and to a phase shifter 60 ($\pi/2$ radians). Phase shifter 60 generates a quadrature local oscillator signal 61, which is applied as a second input to Q-mixer 56. Output signals 55 and 57 of mixers 54 and 56 are respectively applied to conventional integrate, sample and dump (IS&D) circuits 62 and 64.

IS&D circuit 62 is driven by a first clock signal 66 at the bit rate R and IS&D circuit 64 is similarly driven by a second clock signal 68, also at the bit rate R, but delayed by one-half of a bit period, viz., (1/2R) with respect to first clock signal 66. Clock signals 66 and 68 are suitably generated by a clock 70 operating at twice the bit rate, coupled to a divide-by-two circuit 72 such as a binary counter with bi-stable states, which generates synchronized first and second clock signals 66 and 68. Well known bit timing extraction techniques provide synchronization.

The signal path through modulator 28 (FIG. 1) in the transmitter and the signal path through mixer 54 and IS&D circuit 62 in the receiver are hereinafter collectively referred to as the "in-phase channel". Similarly, the signal paths through modulator 30 in the transmitter and through mixer 56 and IS&D circuit 64 in the receiver are referred to as the "quadrature channel".

IS&D circuits 62 and 64 are respectively coupled to a suitable processor 74 which generates a first output signal indicative of the binary sequence impressed on the UPSK signal 48 and a feedback signal to control VCO 58. Processor 74 suitably comprises an adder and subtractor (neither shown) each receptive of the respective output signals 63 and 65 of IS&D circuits 62 and 64, and suitable logic gating circuitry driven by that clock signal 66 or 68, applied to that channel receptive of the delayed data sequence. For example, where the code signal applied to quadrature channel modulator 30 (FIG. 1) is delayed with respect to the code applied to in-phase channel modulator 28 (FIG. 1), clock signal 68 is utilized, slightly delayed, to gate (sample) the outputs of the adder and subtractor of processor 74. The output signal of the adder is representative of the data, and the output signal of the subtractor is utilized as a phase error feedback signal for VCO 58.

UPSK signal 48, transmitted by the transmitter of FIG. 1 represents transitions in the data by $\pi$ radian phase shifts, thus accommodating relatively simple bi-phase demodulation techniques. However, such $\pi$ radian phase shifts are accomplished in two steps of $\pi/2$ radians each step; UPSK signal 48 in response to a data transition (0 to 1 or 1 to 0) is shifted by $\pi/2$ radians for essentially the first half of the bit, then by an additional $\pi/2$ radians for the second half of the bit, to complete the overall $\pi$ radian phase shift. Thus UPSK signal 48 is a four phase signal wherein the phase transitions occur at a maximum rate of twice the bit rate R, the maximum phase difference in any transition is $\pi/2$ radians, and the phasor of the signal rotates in one direction.

Amplitude modulation of phase modulated signals is one of the major causes of spectral sidelobes, such spectral sidelobes causing undesired inter-channel interference. The "stepped" (two steps) phase shift of UPSK signal 48 provides for a low percentage amplitude modulation of UPSK signal 48, and, consequently, low interchannel interference. The half bit delay between the output signals 36 and 38 of mixers 28 and 30 (FIG. 1) ensures that the voltage amplitude of only one of signals 36 and 38 is reduced to zero at a given instant. The sum signal 42 of signals 36 and 38, as generated by summer 40, will thus only vary from 100% to 70.7% of its maximum value, corresponding to a maximum of 17% amplitude modulation. Phase locked loop 44, as described in the above-mentioned application by D. S. Aubert, Ser. No. 649,325 (RCA 67,538), or in the alternative a conventional sequence of filters, limiters and amplifiers, operate to convert the $\pi/2$ radian phase steps into a continuous, uni-directional phase progression and removes the residual 17% amplitude modulation, creating thereby a substantially constant envelope UPSK signal 48.

Figure 3:
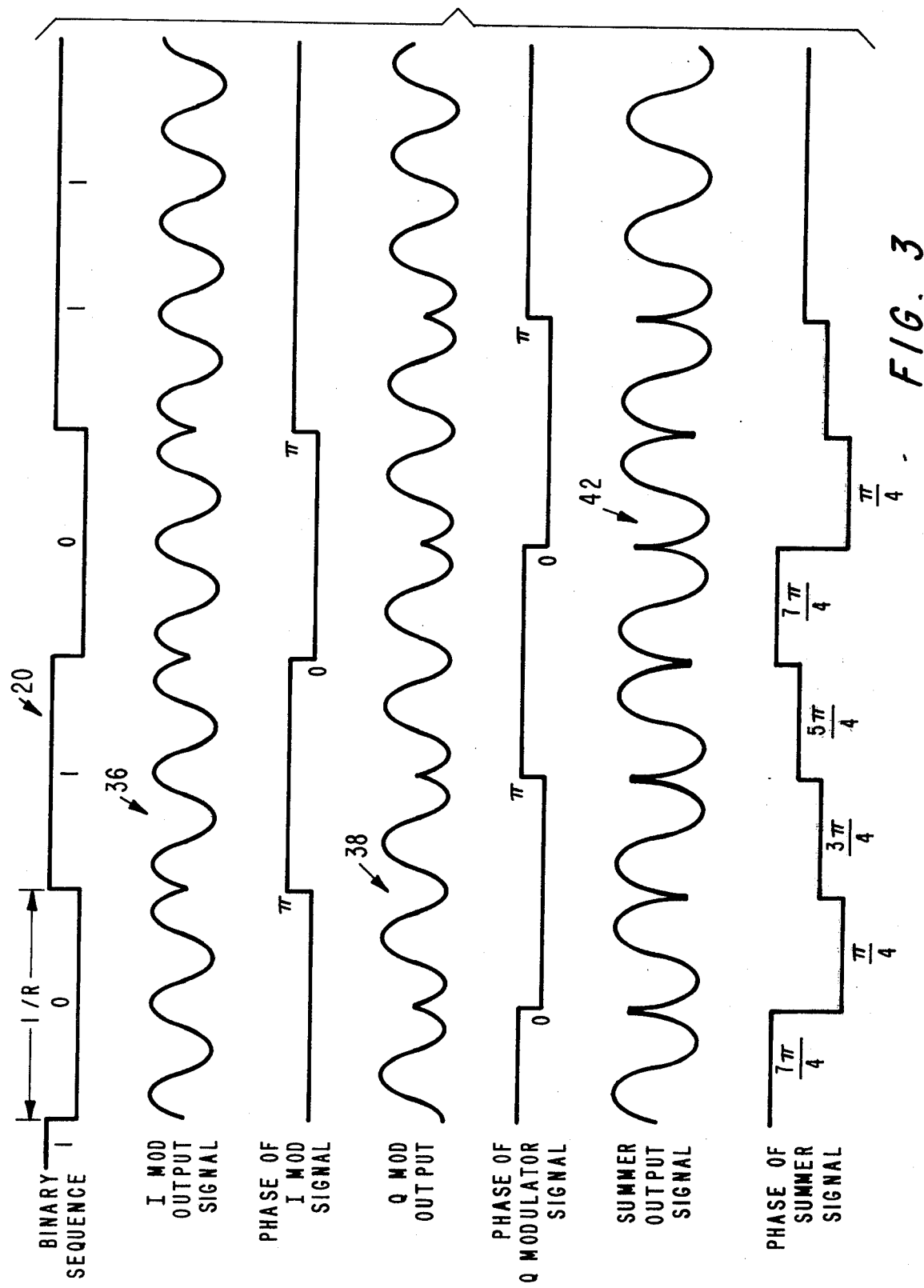
FIGS. 3 and 4 depict the waveforms and phases of various signals associated with the operation of the transmitter of FIG. 1.

Referring now to FIGS. 1 and 3, the generation of UPSK signal 48 will be discussed in more detail. Oscillator 32 generates a carrier signal C(t) which can be mathematically represented as:

$$C(t) = A \cos \omega_0 t \tag{1}$$

where A and $\omega_0$ are, respectively, the amplitude and angular frequency of the signal. Hybrid 34, in effect, splits the carrier signal into in-phase and quadrature components, that is, an in-phase component and a component phase shifted by $+\pi/2$ radians or $-\pi/2$ radians ($\pm 90°$). The immediately following discussion assumes the quadrature component to be shifted by $+\pi/2$ radians, thus leading the in-phase carrier. The voltages $C_I(t)$ and $C_Q(t)$ of such in-phase and quadrature carrier signals, are represented mathematically by equation 2 and 3 below:

$$C_I(t) = \frac{A}{\sqrt{2}} \cos \omega_0 t \tag{2}$$

$$C_Q(t) = \frac{A}{\sqrt{2}} \cos (\omega_0 t + \frac{\pi}{2}) = -\frac{A}{\sqrt{2}} \sin \omega_0 t \tag{3}$$

Phase modulators 28 and 30, hereinafter referred to as the I-modulator 28 and the Q-modulator 30, respectively, operate to bi-phase modulate the $\pi$ radian increments the in-phase and quadrature carrier signals in accordance with the binary code sequence 20. For example, the respective carrier signals are each shifted by 0 radians in response to a 0 bit and $\pi$ radians in response to a 1 bit. An exemplary code sequence 20 of 101011 is shown in FIG. 3. Switchable delay 22, however, effects a half bit, viz., (1/2R) delay between the data sequence applied to I-modulator 28 and the data sequence applied to Q-modulator 30. As will be explained in more detail below, the relative lag or lead of such data sequences controls the direction of phasor rotation of UPSK signal 48. The voltage, $M_I(t)$, of in-phase modulated signal 36 and the voltage, $M_Q(t)$, of quadrature modulated signal 38 may be expressed mathematically as:

$$M_I(t) = f(t) \frac{A}{\sqrt{2}} \cos \omega_0 t \tag{4}$$

$$M_Q(t) = -f(t \pm \frac{1}{2R}) \frac{A}{\sqrt{2}} \sin \omega_0 t \tag{5}$$

where f(t) has a value of +1 or −1 in accordance with the biphase modulation, i.e., 0 or $\pi$, corresponding to the value of binary code sequence 20 at the respective times t and t±1/2R. The waveforms of signals 36 and 38, along with time graphs of their respective phases are shown in FIG. 3, for the case where the quadrature carrier is advanced with respect to the in-phase carrier.

Signals 36 and 38 are summed in summer 40 to produce a sum signal 42. Accordingly, adding equations (4) and (5), the voltage X(t) of sum signal 42, may be expressed mathematically, in terms of a discrete modulation angle $\psi$ (psi), as:

$$X(t) = A \cos (\omega_0 t + \psi) \tag{6}$$

where ψ = π/4; (3π)/4; (5π)/4; (7π)/4; for n/(2R) t (n+1)/2R where n=1, 2, 3 . . . .

The phase progression of sum signal 42 is π/4, (3π)/4, (5π)/4, (7π)/4, (9π)/4, etc., in a cyclic manner and constitutes a unidirectional staircase increase of the phase of signal 42 relative to the original oscillator 32 phase. It should be noted nevertheless that (9π)/4 radians is equivalent to π/4 radians.

Figure 4:
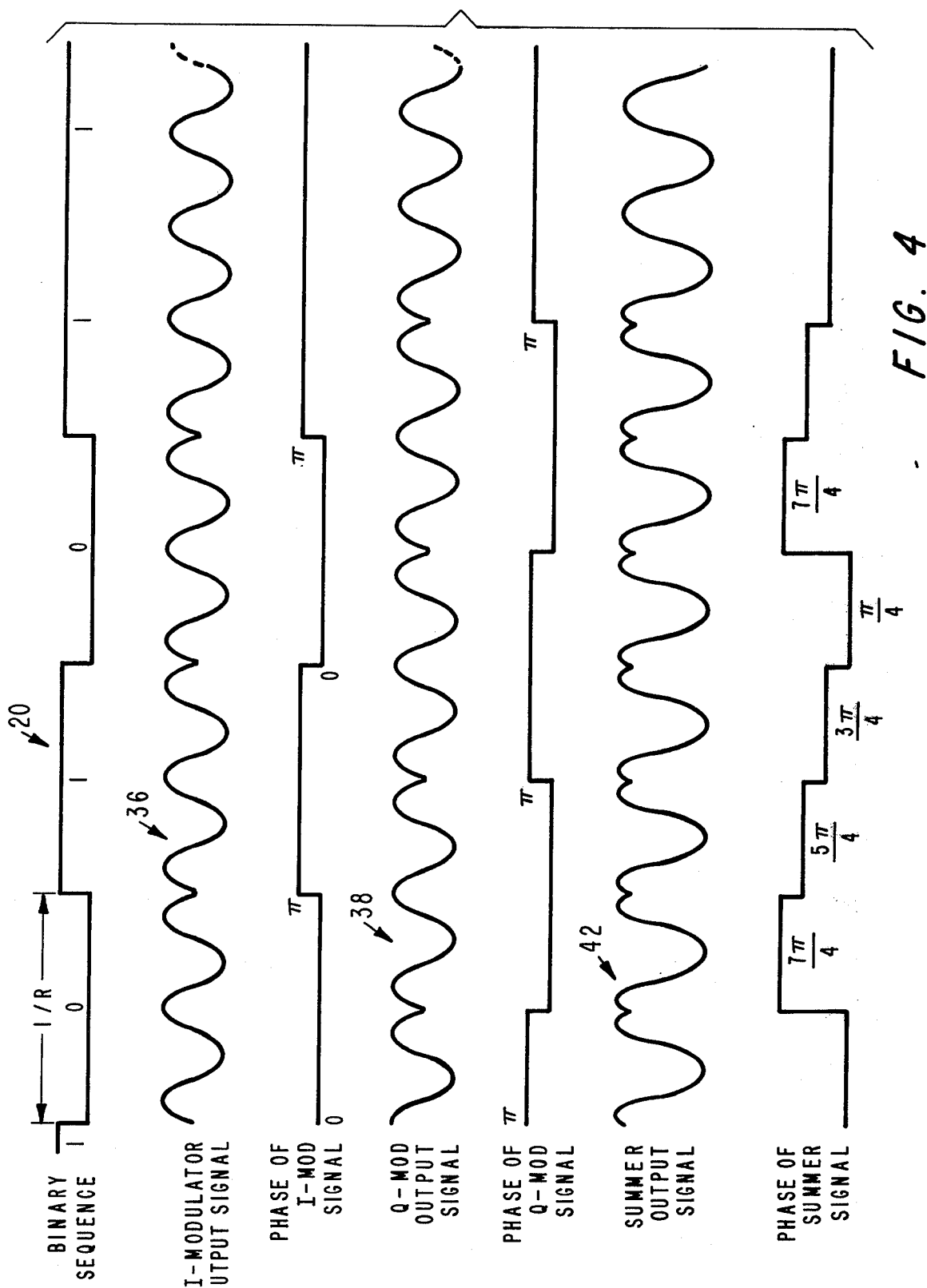

FIG. 4 is a diagram of waveforms similar to those shown in FIG. 3 for a modulator in accordance with the present invention but wherein the carrier is shifted by −π/2 radians with respect to the in-phase carrier thus lagging, (as opposed to leading, as in FIG. 3) the in-phase carrier by π/2 radians. Consequently, the Q-modulator output signal 38 is inverted. The sum signal 42 thus has a different shape and its phase decreases unidirectionally with respect to the carrier in π/2 radian steps. It should be appreciated that such decreasing phase is manifested by a decreasing frequency while the increasing phase example of FIG. 3 is manifested by an increasing frequency.

The receiver depicted in FIG. 2 receives and demodulates UPSK signal 48; such demodulation will now be explained with reference to FIGS. 2 and 5. In demodulating UPSK signal 48, I-mixer 54 and Q-mixer 56 generate output signals 55 and 57, respectively, indicative of the instantaneous phase differences between UPSK signal 48 as received and the in-phase (59) and quadrature (61) local oscillator signals. Thus, mixer output signals 55 and 57 are indicative of the instantaneous discrete modulation angle ψ (equation 6) of UPSK signal 48. Specifically, the output signal 55 of mixer 54 is indicative of the cosine of ψ and the output signal 57 of mixer 56 is indicative of the sine of ψ. Mixer output signals 55 and 57 contain so-called sum and difference frequency components, that is, frequency components corresponding to the sum of the frequencies of UPSK signal 48 and the local oscillator (L.O.) signal, such sum equaling approximately $2f_o$, and a frequency component corresponding to the frequency difference therebetween, such difference being indicative of the data sequence 20. In-phase L.O. signal 59 is in-phase with the carrier signal generated by transmitter oscillator 32 (FIG. 1).

It should be noted that since the transmitted signal 48 is shifted in phase by $$\psi = \frac{(2n + 1)}{4} \pi,$$

the amplitude of I-mixer output signal 55 will be 3 db. below its possible maximum value with ψ=0. Similarly, the amplitude of Q-mixer output signal 57 will be 3 db below its maximum value. Such amplitude reductions, however, do not substantially affect the processing of signals 55 and 57.

IS&D circuits 62 and 64 respectively sample mixer output signals 55 and 57 in response to the respective clock signals 66 and 68 from divider 72 and generate analog signals indicative of ψ. Mixer output signals 55 and 57 are respectively, in effect, filtered by IS&D circuits 62 and 64 to remove the $2f_o$ components and noise. IS&D circuits 62 and 64 generate output signals 63 and 65, which signals 63 and 65 are indicative of the integral over the sampling period of mixer output signals 55 and 57. IS&D output signals 63 and 65 build up during the sampling periods as defined by the respective I-clock and Q-clock signals. The integrated output value at the time of sampling is held until the next sampling pulse occurs, as illustrated in FIG. 5.

Figure 5:
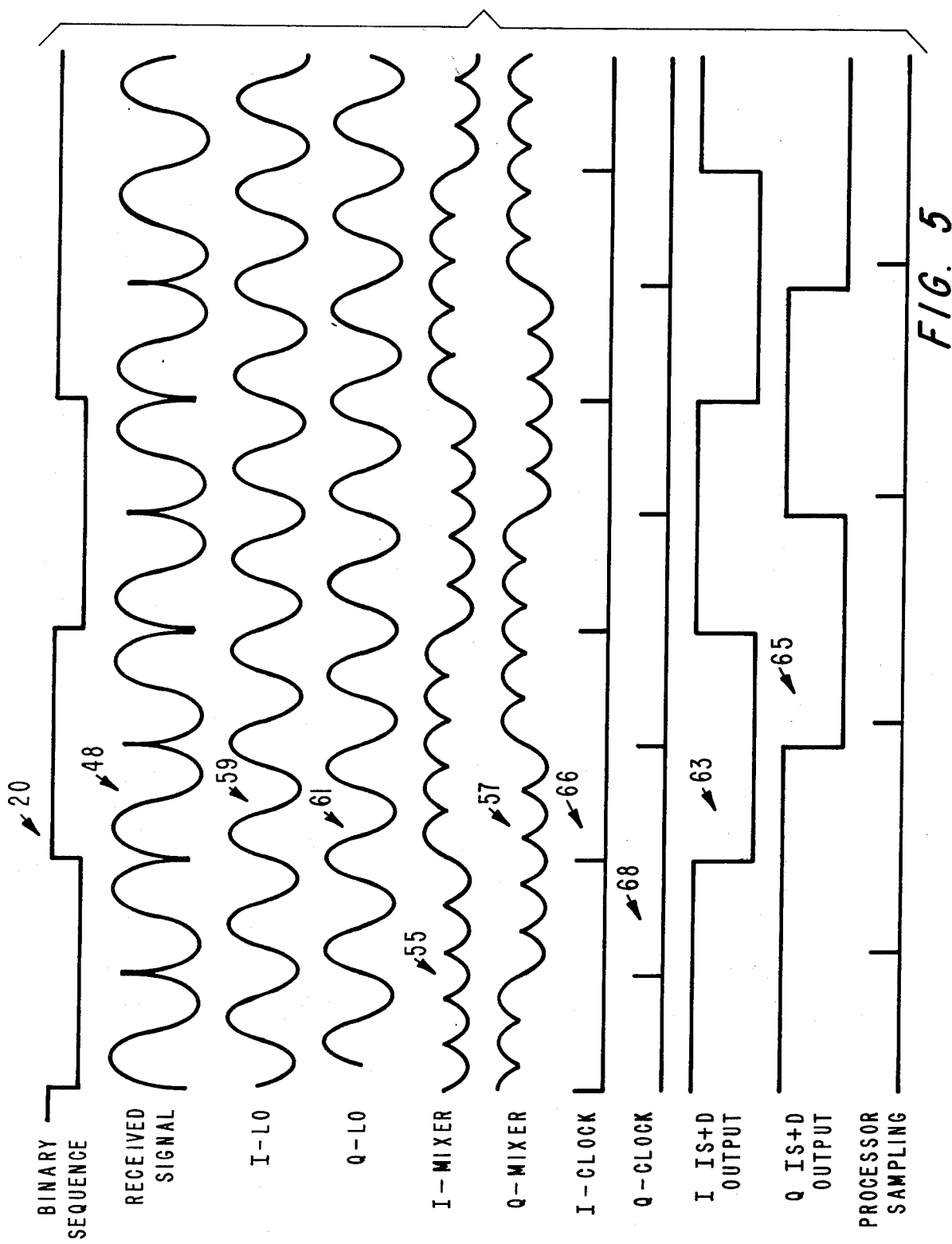
FIG. 5 depicts the waveforms of various signals associated with the operation of the receiver of FIG. 2.

It should be appreciated that the frequencies of the respective waveforms as depicted in FIGS. 3, 4 and 5 are chosen for ease of illustration. In practice, the bit rate R may be in the 10 M bit/s range, and the carrier frequency $f_o$ in the vicinity of 70 MHz.

IS&D output signals 63 and 65 are applied to processor 74, which operates to reconstruct code sequence 20. Processor 74, in effect, samples the IS&D output signals, slightly after the clock pulse to the channel receiving the lagging data signal, such that sampling occurs after both the in-phase and quadrature representations of a given data bit have been sampled by IS&D's 62 and 65. An example of such sampling times is illustrated in FIG. 5, for the case wherein the quadrature signal is delayed with respect to the in-phase signal. The sampled values of I-IS&D and Q-IS&D output signals 63 and 65 are summed slightly after the quadrature clock sampling pulse (signal 68, FIG. 5) to obtain a data decision. When the delay is in the in-phase channel, sampling occurs in accordance with in-phase clock signal 66.

It should be noted that phase error, due to, for example, doppler shifting of UPSK signal 48, may be present in the output signals of mixers 54 and 56. Processor 74 derives a phase error signal by subtracting IS&D output signals 63 and 65, as sampled slightly after the clock pulses to the lagging channel; in FIG. 5 such clock signal is quadrature clock signal 68. The phase error signal is applied to, to control in a closed loop fashion, VCO 58.

The power (frequency) spectrum W(f) of the unfiltered UPSK signal, i.e., sum signal 42 is computed to be:

$$W(f) = \frac{A^2}{2R} \left[ \frac{\sin \left( \frac{\pi (f - f_o)}{R} \right)}{\frac{\pi (f - f_o)}{R}} \right]^2 \left[ 1 \pm \sin \left( \frac{\pi (f - f_o)}{R} \right) \right] \quad (7)$$

where $f_o$ is the carrier frequency $$(\frac{\omega_o}{2\pi}),$$

f is the frequency of concern, R is the bit rate and A is the amplitude of the signal component at $f_o$. In equation (7) the first bracketed term describes the power spectrum of a conventional phase modulated signal. The second bracketed term is due to the unidirectional modulation in π/2 radian increments. The sign of the second bracketed term will be positive or negative depending on the relative delay between signals 24 and 26 as provided by delay device 22. In either case, the second bracketed term will periodically become zero and thus cause the power spectrum to be zero, even though the first bracketed term has a non-zero value. Portions of the undesired spectral sidelobes are thereby reduced to zero.

It should be appreciated that phasor rotation in one direction will be manifested as a frequency shift from the carrier frequency, such a shift being disadvantageous in some instances. Such frequency shift may be avoided, while still retaining the beneficial spectral effects of unidirectional phasor rotation, by periodically reversing the phasor direction at some rate lower than the bit rate R. Such a signal is termed an "orthogonal" UPSK signal. The periodic reversal of phasor direction in orthogonal UPSK signals causes the output frequency spectrum to fluctuate, with equal shifts, about the carrier frequency $f_o$. The reversal of phasor direction, as in a conventional phase modulated system, will introduce spectral sidelobes in accordance with the first bracketed term of equation (7). However, when the reversal rate is R/N, where N is the number of data bits between reversals, the spectral width due to the phasor reversals is reduced by a factor of N. When N is large, say 100, the spectral sidelobe components due to the phasor direction reversal are quite small. It should be appreciated that the phase reversal rate is not data dependent and can thus be chosen such that a reversal occurs at the beginning of each word, to serve thereby as a word sync.

The direction of phasor rotation is determined by the respective lag or lead of the modulated in-phase and quadrature signals 36 and 38 (FIG. 1). Accordingly, the direction of phasor rotation may be controlled by switching the half bit delay 22 between the in-phase and quadrature channels to change thereby the respective lag or lead of the data sequences applied to the I-modulator 28 and Q-modulator 30. In other words, the direction of phasor rotation can be controlled by delaying the data sequence 20 to phase modulator 28 with respect to phase modulator 30 such that the code sequence to I-modulator 28 lags the code sequence to Q-modulator 30, or vice versa.

Processor 74, in an orthogonal UPSK system wherein the direction of phasor rotation is periodically reversed, suitably includes two pairs of adders and subtractors, (not shown) all receptive of the respective IS&D output signals 63 and 65. One adder-subtractor pair, in effect, samples signals 63 and 65 slightly after pulses in in-phase clock signal 66; the other pair, in effect, samples signals 63 and 65 slightly after pulses in quadrature clock signal 68. The output signals of the respective adders are compared. The amplitude difference is indicative of the respective lag and lead of the in-phase and quadrature channels, and hence, determines the sampling clock to be used, as between the in-phase and quadrature clock signals 66 and 68. A data determination is made in accordance with the adder output signal having the larger amplitude. The output signal of the corresponding subtractor is utilized as the phase error signal to VCO 58.

Figure 6:
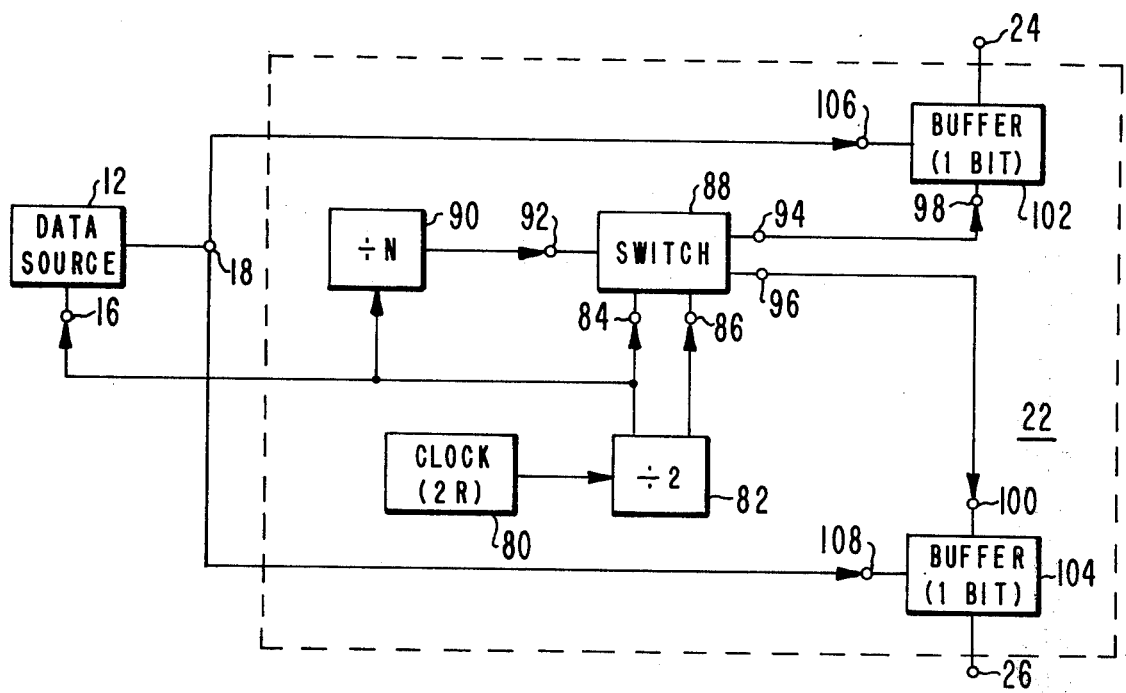
FIG. 6 is a block diagram of a preferred embodiment of delay 22 used in the transmitter of FIG. 1.

Referring now to FIG. 6, a preferred embodiment of a switchable delay 22 (for transmitter of FIG. 1) is described, wherein switchable delay 22 also functions as clock 14. A clock 80 similar to clock 70 in the receiver in FIG. 2, operating at twice the bit rate R, is coupled to a divide-by-two circuit 82 similar to divider 72 in the receiver. Divider 82 generates first and second signals at the bit rate R. The second bit rate signal is delayed with respect to the first bit rate signal by one-half of a bit period, viz., 1/(2R). Such first and second bit rate signals are respectively applied to terminals 84 and 86 of a crossover switch 88. In addition, the first bit rate signal is applied through a conventional divider circuit 90, to control terminal 92 of switch 88 and is further applied as the clock signal to terminal 16 of data source 12. The output terminals 94 and 96 of switch 88 are respectively coupled to load control terminals 98 and 100 of one bit buffer registers 102 and 104. The input terminals 106 and 108 of buffers 102 and 104 are coupled to data source output terminal 18. The output terminals of buffers 102 and 104 are utilized as output terminals 24 and 26 of switchable delay 22.

In operation, clock 80 and divider 82 generate first and second clock signals at the bit rate R, with the second clock signal delayed by one-half of a bit viz., 1/(2R), from the first signal. Switch 88 operates to apply the respective clock signals to control terminals 98 and 100 of buffers 102 and 104, and in response to signals applied to switch control terminal 92, reverse the application of the delayed second clock signal as between buffers 102 and 104. Buffers 102 and 104 read in the instantaneous value of code sequence 20 in response to the clock signals applied to terminals 98 and 100 thereof, and retain such code value until the next applied clock pulse. Accordingly, the buffer to which the delayed second clock signal is applied generates an output signal indicative of the code sequence 20 but which is delayed by one-half of a bit period from the output signal of the other buffer. Switch 88 can be made to periodically switch the delay between buffers 102 and 104 by deriving a control signal from the first clock signal. For example, such a control signal can be derived by dividing the bit rate signal by an appropriate number, such as the number of bits in a word, and utilizing the quotient signal to control switch 88.

A UPSK signal wherein the phasor direction is periodically reversed, may alternatively, be generated by periodically reversing the data applied to the in-phase or quadrature modulator rather than, as embodied in FIG. 1, by switching the delay between the respective in-phase and quadrature channels. Such a system is embodied in FIG. 7. A fixed half-bit delay 110 is set, for example, in the quadrature channel and an exclusive OR gate 112, receptive of the data sequence 20 and a reversal control signal, operates to complement periodically the data sequence applied to quadrature channel modulator 30. The reversal control signal may be, for example derived from the bit rate clock signal as by a divider 114.

Figure 7:
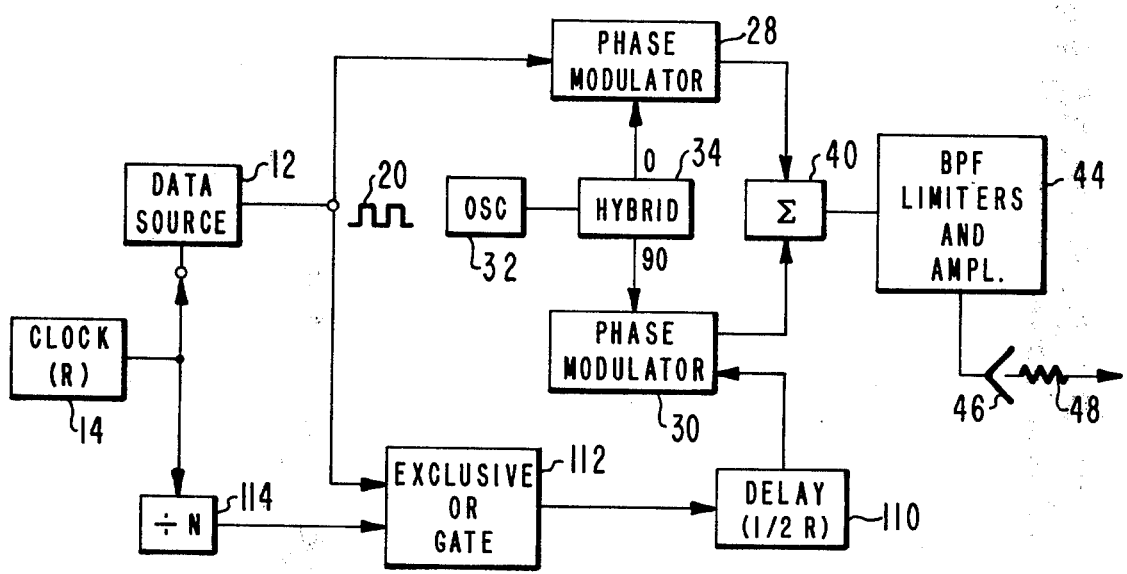
FIG. 7 shows an alternative embodiment of an orthogonal UPSK transmitter in accordance with the present invention.

When an orthogonal UPSK transmitter such as depicted in FIG. 7 is utilized, processor 74 in the receiver utilizes only a single adder-subtractor pair, the output thereof being sampled in accordance with the lagging clock signal. For example, quadrature clock signal 68 is utilized as the sampling clock when delay 110 is in the quadrature channel as shown in FIG. 7. The amplitudes of the output signals of the adder and subtractor are compared and that signal with the largest absolute value of amplitude is utilized to make a data decision. The signal having the smaller absolute value is indicative of the phase error in the local oscillator and is used to control VCO 58 (FIG. 2).

It should be appreciated that the output frequency spectrum of UPSK and orthogonal UPSK signals are comparable to the output frequency spectrum of MSK and OK-QPSK signals. However, it should be further appreciated, from the above description, that the implementation of a UPSK or orthogonal UPSK communication system is considerably less complex than the implementation of MSK or OK-QPSK systems.

It should further be appreciated that, in conjunction with a suitable data source, the UPSK transmitter of FIG. 1 can be utilized to generate continuous frequency modulation or discrete frequency shift keying. Further, phase modulators 28 and 30 may shift the respective carrier signals by $\pi$ radians in response to bit transitions, as opposed to 0 radians in response to 0 bits and $\pi$ radians in response to a 1 bit, where a corresponding demodulation process is implemented.

What is claimed is:

1. In a binary data communication system of the type including a transmitter and receiver, said transmitter comprising a data source means for supplying binary data signals having a predetermined bit period, first means for generating first and second carrier signals, said second carrier signal being substantially in quadrature with said first carrier signal, second means responsive to said first and second carrier signals and said data signals for phase-modulating said first and second carrier signals by said binary data signals, and third means for generating an output signal representative of the sum of said phase-modulated signals, the improvement wherein:

said transmitter further includes fourth means for delaying by substantially half the bit period of said data signals the modulation of one of said first and second carrier signals with respect to the other, whereby phase shifting is effected in steps in a predetermined phasor direction to reduce sidebands in the frequency spectrum of the output signal generated by said third means.

2. The system of claim 1 wherein
said fourth means further includes fifth means for alternating at a transition rate said delay between said first and second carrier signals, said transition rate being less than the bit rate of said data signal.

3. The system of claim 2 wherein said second means comprises first and second phase modulators, responsive to said data signal and respectively to said first and second carrier signals, and wherein further said fifth means comprises:

sixth means for generating first and second clock signals at said bit rate, said second clock signal being delayed by one half cycle with respect to said first clock signal, seventh and eighth means, each responsive to said data signal and respective control signals applied thereto, for temporarily storing the instantaneous values of said data signal in response to said respective control signals, said seventh and eighth means respectively applying signals indicative of said values to said first and second phase modulator; and ninth means, for switchably applying said first and second clock signals to said seventh and eighth means as said control signals.

4. The system of claim 3 wherein said fifth means further includes:

tenth means, responsive to one of said clock signals, for deriving therefrom a switching signal, said switching signal being applied to said ninth means to effect periodic switching of said respective clock signals between said seventh and eighth means.

5. The system of claim 4 wherein said tenth means comprises a divider receptive of said one clock signal, for generating one pulse in response to a predetermined number of pulses in said one clock signal.

6. The system of claim 5 wherein said data consists of a plurality of words, each of said words consisting of a predetermined plurality of bits and wherein further said predetermined number is equal to the number of bits in one of said words.

7. The system of claim 2 wherein said second means comprises first and second phase modulators, responsive to said data signal and respectively to said first and second carrier signals and wherein further said fifth means comprises, sixth means, receptive of said data signal for periodically complementing the data signal applied to one of said phase modulators.

8. The system of claim 7 wherein said fifth means further includes seventh means, receptive of a signal indicative of said bit rate, for generating a complementing signal, said complementing signal being applied to said sixth means to effect said periodic complementing in accordance with the cumulative duration of a predetermined number of bits.

9. The system of claim 8 wherein said data consists of a plurality of words, each word consisting of a predetermined plurality of bits, wherein further said predetermined number is equal to said predetermined plurality of bits in one of said words.

* * * * *